United States Patent
Kohlgrüber et al.

(10) Patent No.: US 6,761,797 B2
(45) Date of Patent: Jul. 13, 2004

(54) APPARATUS FOR CARRYING OUT MASS TRANSFER PROCESSES

(75) Inventors: Klemens Kohlgrüber, Kürten (DE); Frank Weyrich, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/995,139

(22) Filed: Nov. 27, 2001

(65) Prior Publication Data

US 2002/0092625 A1 Jul. 18, 2002

(30) Foreign Application Priority Data

Dec. 27, 2000 (DE) .......................... 100 65 440
Sep. 10, 2001 (DE) .......................... 101 44 233

(51) Int. Cl.[7] .............. B01D 1/00; B01D 3/06
(52) U.S. Cl. ............ 159/2.1; 159/43.1; 159/47.1; 159/DIG. 10; 202/158; 202/259; 202/262; 528/501
(58) Field of Search .............. 159/43.1, 47.1, 159/2.1, DIG. 10, 27.4; 202/158, 259, 262; 203/88; 528/501

(56) References Cited

U.S. PATENT DOCUMENTS

| 2,490,080 A | 12/1949 | Melvill |
| 2,719,776 A | 10/1955 | Kümmel |
| 3,630,689 A | 12/1971 | Wheeler et al. ............... 23/285 |
| 3,694,535 A | * 9/1972 | Kimoto et al. ............... 264/102 |
| 4,130,527 A | * 12/1978 | Miller et al. ................. 523/318 |
| 4,578,455 A | 3/1986 | Pipper et al. ................ 528/501 |
| 4,934,433 A | 6/1990 | Aboul-Nasr ............... 159/43.1 |
| 5,024,728 A | 6/1991 | Morita et al. .............. 159/27.4 |
| 5,459,168 A | 10/1995 | Nasr et al. .................. 521/49.8 |

FOREIGN PATENT DOCUMENTS

| CA | 2 168 630 | 8/1997 |
| DE | 22 43 024 A1 | 3/1973 |
| DE | 22 06 230 A1 | 8/1973 |
| DE | 33 10 676 A1 | 9/1984 |
| DE | 43 28 013 C1 | 9/1984 |
| EP | 1 050 352 A2 | 11/2000 |

* cited by examiner

*Primary Examiner*—Virginia Manoharan
(74) *Attorney, Agent, or Firm*—Norris McLaughlin & Marcus P.A.

(57) ABSTRACT

Apparatus for carrying out mass transfer processes with high-viscosity liquids comprising a vertically arranged vessel (1) having a feeder (4) for the liquid to be treated, an outlet (7) for volatile components and an outlet (6) for the treated liquid, the feeder means (4) being equipped with a distributor element (3) having a multiplicity of orifices (8, 10) for subdividing the high-viscosity liquid to be treated into a multiplicity of individual streams, wherein essentially vertically arranged wire loops (2) are disposed in the vicinity of the orifices (8, 10), along which wire loops the high-viscosity liquid runs off under the action of gravity.

21 Claims, 8 Drawing Sheets

APPARATUS FOR CARRYING OUT MASS TRANSFER PROCESSES

The invention relates to an industrial apparatus for carrying out mass transfer processes with high-viscosity liquids, particularly for boiling down and/or devolatilizing polymer melts. The apparatus is essentially based on a vertically disposed vessel, in which the high-viscosity liquid to be treated is divided into a multiplicity of individual streams which under the action of gravity run off into the sump of the vessel.

BACKGROUND OF THE INVENTION

Important mass transfer processes in the case of liquids include boiling down and devolatilization of solutions, dispersions or melts. During the preparation of polymer plastics, in particular, the problem of separating low molecular weight substances, e.g. water or monomers, from the plastic melt is encountered, as such substances adversely affect product quality or, in some cases, are even toxic.

To boil down polymer melts, use is often made, according to the prior art, of thin-film evaporators, as described in the publications DE 3 310 676 A1, DE 4 328 013 A1 and U.S. Pat. No. 3,630,689. The drawbacks of such machines are the relatively high investment costs and especially the wear of rotating parts of such machines.

Also known are strand evaporators, in which the polymer melt is divided, in a vertically disposed vessel, by means of a nozzle plate into a multiplicity of individual strands or filaments which in free fall flow separately and parallel to one another through the vessel from top to bottom and are recombined at the vessel bottom. The polymer melt is therefore separated at the head of the vessel into strands which taper in free form under the influence of gravity and at the bottom of the vessel dip into the melt sump. Such apparatuses are described in the patents U.S. Pat. No. 2,719,776, U.S. Pat. No. 5,024,728 and U.S. Pat. No. 4,934,433. A basic drawback of the apparatuses described is that these are suitable only for those liquids which, after emerging from the nozzle plate, by themselves form long filaments in a similar manner as in a spinning process. A further drawback is that a prolonged dwell time in the devolatilizing chamber can only be achieved with the aid of a very great drop out and consequently great overall height of the apparatus.

In addition, the publication CA 2 168 630 describes a method of preparing polycarbonate, wherein a mixture of monomers and prepolymer is distributed onto a multiplicity of individual wires which are arranged vertically in a reactor and along which the liquid mixture runs off downwards and at the same time polymerizes to completion. The polymerization therefore takes place in a thin liquid strand enveloping the wire; i.e. by means of the vertically mounted wires a defined polymerization zone is established in the reactor. This publication gives no description of the devolatilization of finished polymer solutions.

It is an object of the invention to develop an industrial apparatus for mass transfer processes which ensures a long product dwell time in the gas space while maintaining as narrow as possible a dwell time spectrum and which is also suitable for high-viscosity liquids where the formation of continuous strands or filaments is impaired or prevented by foaming or the formation of bubbles.

SUMMARY OF THE INVENTION

This object is achieved, starting from the apparatus described at the outset comprising a vertically disposed vessel, by wire loops being disposed essentially parallel to the vertical plane at the liquid feeder means in the vessel, at the top ends of which wire loops at least one liquid feeder means each is provided for feeding in a substream which runs off downwards along the wire loop. "Parallel to the vertical plane" in this case means that the plane of the wire loop coincides with the vertical plane, minor deviations being quite permissible all the same. In the case of a high-viscosity, nonfoaming liquid the substream running off via the wire loop forms a liquid lamella and in the case of a foaming liquid forms a thin layer which extends in part or in its entirety across the plane of the wire loop. In both cases, the liquid is delimited and guided by the wire loop. At the top end of the wire loop the liquid is supplied continuously. At the bottom end it drips off again. The effect of the wire loop is that the thin liquid layer or lamella is stabilized and maintained in the flowing state, large phase interface areas being provided for mass transfer.

The invention relates to an apparatus for carrying out mass transfer processes with high-viscosity liquids, particularly for boiling down and/or devolatilizing polymer melts, comprising at least one vertically disposed vessel having a feeder means for the liquid to be treated, an outlet for volatile components and an outlet for the treated liquid, the feeder means being equipped with a distributor element having a multiplicity of orifices for subdividing the high-viscosity liquid to be treated into a multiplicity of individual streams, characterized in that essentially vertically arranged wire loops are disposed in the vicinity of the orifices, along which wire loops the high-viscosity liquid runs off under the action of gravity.

The wire loops can have different geometries, e.g. form squares, rectangles or triangles. The wire loops are preferably bent from steel wire having a thickness of from 0.5 to 6 mm and, depending on the field of application, preferably have a length (height) of from 0.5 to 4 m.

In a preferred apparatus, the distributor element is a perforated plate.

Preferably, according to one variation, the distributor element includes at least one horizontally arranged tube which has orifices for the outflow of the high-viscosity liquid pointing downwards and/or upwards (i.e. counter to the direction of flow of the liquid).

Preferably, for better cleaning, the wire loops in the vicinity of the orifices in the distributor element are disposed detachably.

Particularly advantageous is an apparatus in which the distributor element comprises at least one horizontally arranged tube which has slotted orifices pointing upwards.

Particularly preferably, the distributor tubes have an inner diameter of from 10–100 mm. The slot width of the orifices is particularly preferably 0.2–10 mm, and the slot length, particularly preferably, is 10–100 mm.

More easy to clean is also a further preferred variation of the apparatus, in which the distributor element comprises at least one horizontally arranged tube which has slotted orifices pointing upwards, into which the wire loops are clipped.

Particularly preferred is an apparatus in which two, three or more of the wire loops at a time are combined into a basket-like lattice or wire mesh.

Particular advantages also result if, in a preferred embodiment of the apparatus, two or more adjacent lattices or wire meshes are linked to one another.

To achieve a further increase in stability in a particularly preferred embodiment of the apparatus, the wire loops can be additionally attached to the vessel bottom.

In a preferred embodiment, the wire loops can be heated, particularly by means of electric resistance heating means.

A further preferred variation of the apparatus is characterized in that the distributor elements are formed by heat exchange tubes which are vertically arranged in the vessel, debauch into the vessel and have orifices, the wire loops being attached to the bottom ends of said heat exchange tubes.

The area enclosed by a wire loop is preferably from 0.5 cm to 2500 cm$^2$.

Another preferred embodiment of the apparatus is characterized in that the wire loops taper in the direction of flow of the liquid and, in particular, terminate in an acute angle at their bottom ends.

For the purpose of improved heat exchange in a particular embodiment of the apparatus, the vessel is designed to be heatable and/or coolable, and in particular is provided with a jacket for an electric heater or for a heat transfer medium to be passed through.

A further alternative of the invention consists in the wire loops not being fastened to a distributor tube or a distributor plate or to the heat exchange tubes as described above, but instead being disposed, by means of a suitable mounting, on the vessel bottom, whilst still running to the orifices of the distributor tubes or distributor plate or to the vertical heat exchange tubes.

The invention achieves the below-described advantages, compared with the apparatuses known from the prior art:

Compared with a strand evaporator, considerably longer product dwell times can be obtained in the gas space.

A suitable selection of the geometry of the wire loops (especially their length and area!) allows the dwell time to be varied further within wide limits and to be tailored to process-specific requirements.

The publication CA 2 168 630 describes vertically arranged wires for the purpose of extending the product dwell time in a reactor. In this arrangement, a wire is associated with one or more product outlet orifices. Owing to the driving gravitational force, the product flows downwards along the vertical wires. Adhesion of the product to the wire surface results in shear stresses which, especially in the case of high-viscosity products, counteract the force of gravity. This allows the mean product dwell time to be extended compared with free-falling filaments (as in the case of the strand evaporator).

Compared with the reactor apparatus comprising a single vertical wire, the apparatus according to the invention comprising a wire loop or wire mesh, which e.g. is produced by partial or complete linkage of the wire loops, which inevitably will not be strictly vertical throughout, has various advantages:

The wire loops will often be in contact with polymer foam which does not evenly enter the devolatilization vessel, the individual product orifices instead being subject to fluctuations in throughput. A vertical wire is unable to cushion these product pulsations to any significant extent, which means that the product quality at the outlet will likewise fluctuate considerably. A simple wire loop evens out these fluctuations in a number of respects. Furthermore, the product dwell time distribution and the mean product dwell time can be adjusted much more flexibly. Specifically, the advantages are as follows:

By virtue of an arrangement in which more than one vertical wire section is supplied with product, the product run-off at the wires is evened out as a result of the lamella effect.

By virtue of the wire loops tapering off (the wires pointing downwards are not aligned precisely vertically), different product inlet orifices are able to wet a wire loop with product. This results in considerable evening-out in the event of pulsed delivery from the individual orifices (overall, the product delivery as a rule is constant by virtue of an upstream pump).

The preferred crosslinks of the wires (transverse to the force of gravity) result in an additional flow resistance encountered by the product (known as resistance coefficient Cw or pressure loss coefficient Cd). In particular, a lattice which is mounted transverse to the flow direction and has a specific packing density results in advantages regarding adjustable product dwell time based on the wire surface and the evening-out described.

Wire lattices transverse to the product inflow can also be used multiply in a plurality of superposed layers, resulting in high design flexibility to achieve the desired flow resistance. In the case of high-viscosity products, the lattice can usually be wide meshed. The lattice is also effective, however, in the case of low-viscosity liquids, if the packing density of the wires is close: a collimated jet vertically impinging on a screen face intermittently is expanded and will leave the screen surface with approximately constant throughput.

Compared with the known apparatus comprising single, suspended wires, the interlinking of the wire loops (lattice) additionally results in considerably higher mechanical stability.

Particularly preferred, therefore, is an apparatus characterized in that one or more wire lattices essentially arranged horizontally above one another are additionally provided below the orifices.

Also preferred is a variation of the apparatus in which the top ends of the wire loops are disposed at different orifices, particularly at distant orifices not disposed directly next to one another.

The defined laminar flow of high-viscosity media in the wire loops ensures a narrow dwell time spectrum. This means that all the liquid volume elements in the apparatus will undergo approximately the same thermodynamic process. This results in greater uniformity in product quality, especially of thermally sensitive products.

Compared with the known apparatuses, a large phase interface area is provided for mass transfer in the gas space.

The apparatus according to the invention is suitable for devolatization both of foaming and of nonfoaming polymers. In the case of the devolatilization of foaming polymers, as far as devolatization efficiency is concerned, the advantages of thin-film devolatilization can be combined with the advantages of foam devolatilization.

The total surface area of the wire loops made of metal is comparatively small, thereby greatly reducing the risk of the product being damaged by undesirable chemical reactions on the metal surfaces (e.g. cracking processes).

The outlay in terms of equipment to implement the apparatuses according to the invention is less, compared with the known apparatuses.

The main fields of application of the invention, as already described, are boiling down and devolatilization of high-viscosity polymer melts, particularly in a viscosity range of 0.01–40000 Pa.s, but also selective chemical reactions between the liquid layer in the wire loop and the surrounding gas space which contains a reactive gas component, and condensation reactions.

The invention therefore also relates to the use of the apparatus according to the invention for boiling down and devolatilizing high-viscosity liquids, particularly for boiling down and/or devolatilizing polymer solutions or polymer melts, equally preferably polycarbonate solutions or polycarbonate melts and the use for carrying out chemical reactions between the liquid layer in the wire loop and the surrounding gas space which contains a reactive gas component, and for condensation reactions.

The invention is explained below in more detail with reference to the figures by means of the examples, which do not limit the invention, however.

BRIEF DESCRIPTION OF THE DRAWING

In the figures:

FIG. 10b shows an enlarged detail of FIG. 10a.

EXAMPLES

Example 1

Figure 1:
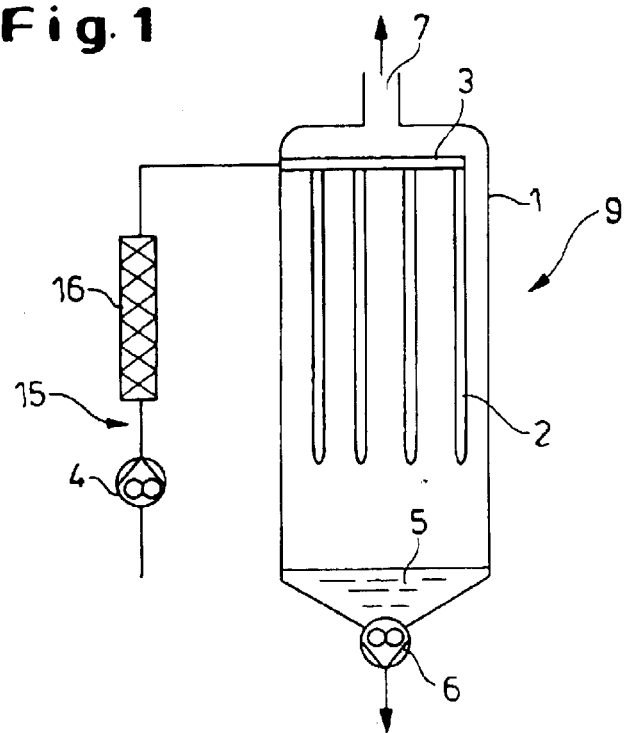
FIG. 1 shows the design principle of a mass transfer apparatus comprising fitted wire loops.

According to FIG. 1, a vertically disposed devolatilization vessel 1 is equipped with four wire loops 2 likewise extending in a vertical direction. The wire loops 2 are fastened to a distributor element 3 which runs horizontally and here is in the form of a tube. The distributor tube 3 is connected to a product feeder means 4. The devolatilized product is discharged at the sump 5 of the vessel 1 with the aid of a gear pump 6. The vapours produced during the volatilization are drawn off through the connection 7. Via the connection 7 it is possible to set a predefined reduced pressure in the vessel 1. The vessel 1 can be heated by means of electrical heating means (not shown).

Figure 2:
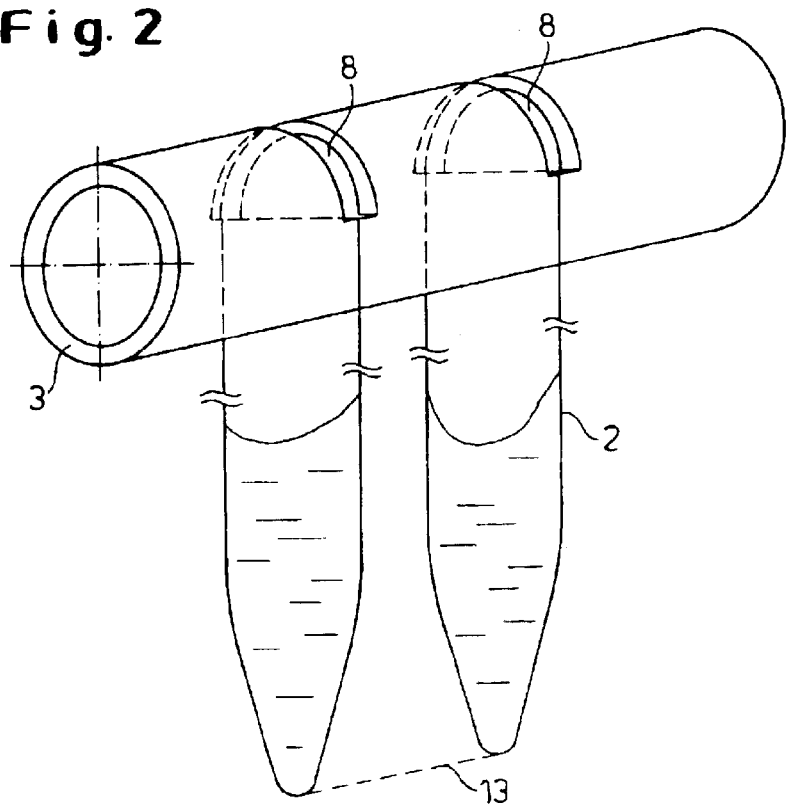
FIG. 2 shows a distributor tube having liquid orifices and wire loops associated with the orifices, FIGS. 3a,b shows the arrangement of wire loops at a nozzle plate in a longitudinal section (FIG. 3a) and cross section (FIG. 3b), FIGS. 4a,b shows an arrangement of wire loops in a longitudinal section (FIG. 4a) and cross section (FIG. 4b), on vertically disposed heat exchange tubes, each heat exchange tube having one wire loop associated therewith, FIGS. 5a,b shows an arrangement of wire loops in a longitudinal section (FIG. 5a) and cross section (FIG. 5b), on vertically disposed heat exchange tubes, two adjacent heat exchange tubes at a time having one wire loop associated therewith.

FIG. 2 shows how the wire loops 2 are fastened to the distributor tube 3. They are clipped in such a way into slotted orifices 8 disposed on the top half of the distributor tube 3, that the slotted orifice 8 extends in the longitudinal direction across the entire width of the wire loop, so that the wire loop is in contact, over its full width, with a product liquid to be devolatilized. The slots 8 point upwards in the way of a semicircle, so that the product liquid can flow around the tubes 3 and the tube surfaces are washed by the product. One advantage of this arrangement is that the dwell time of the product liquid is increased. A further increase in the dwell time of the product liquid can be achieved by an increase in the tube parameter. At the same time, this reduces the pressure gradient in the tube, resulting in more uniform throughput in the slotted orifices 8. The tubes 3 have an inside diameter of 16 mm. The slot width is 3 mm, for example, and the slot length about 27 mm. At their bottom ends above the sump, the wire loops 2 taper off to a point. In one variation, the pointed ends of adjacent wire loops 2 are linked to one another via a welded-on wire 13.

Example 2

Figure 3A:
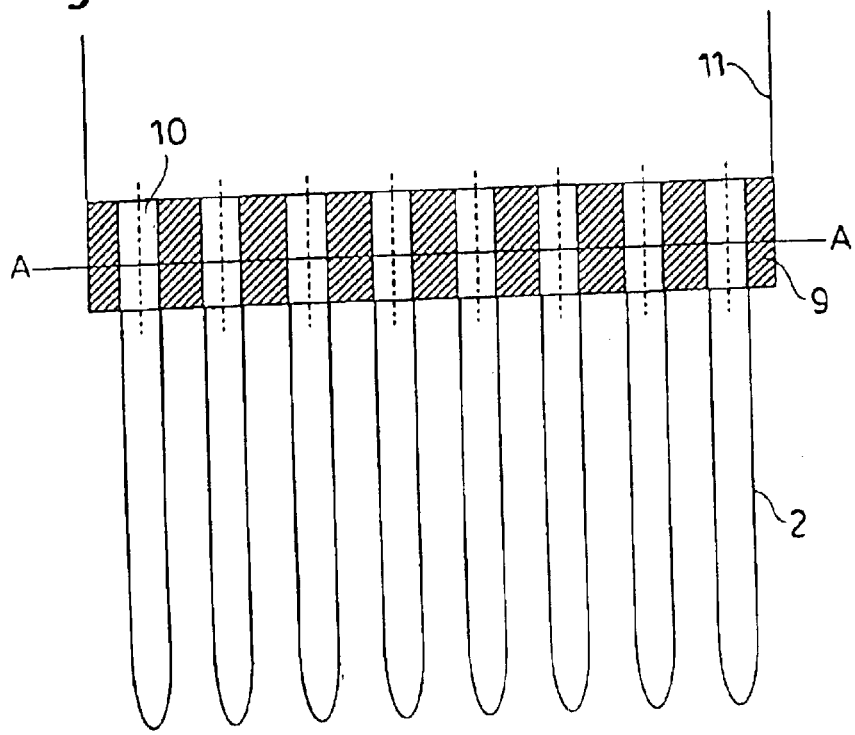
Figure 3B:
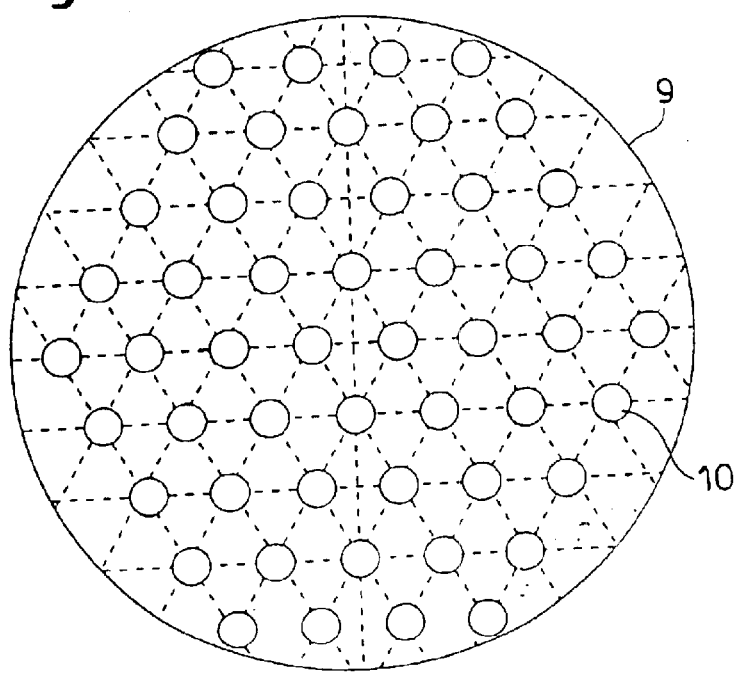

In another evaporator arrangement according to FIG. 3 (side view and plan view from above), the distributor element for the feeder arrangement of the product liquid consists of a nozzle plate 9 having orifices 10. The wire loops 2 are fastened to the underside of the nozzle plate 9, e.g. welded on or soldered on. The product liquid is supplied via a feeder 11 covering the entire cross section of the nozzle plate 9. The feeder 11 can also be designed as a heat exchange tube.

Example 3

Figure 4A:
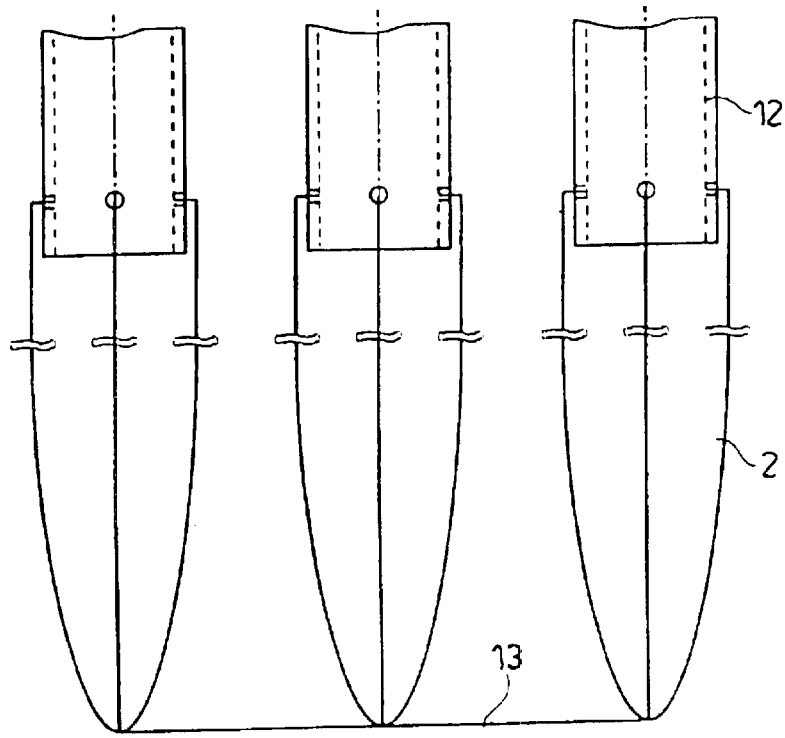
Figure 4B:
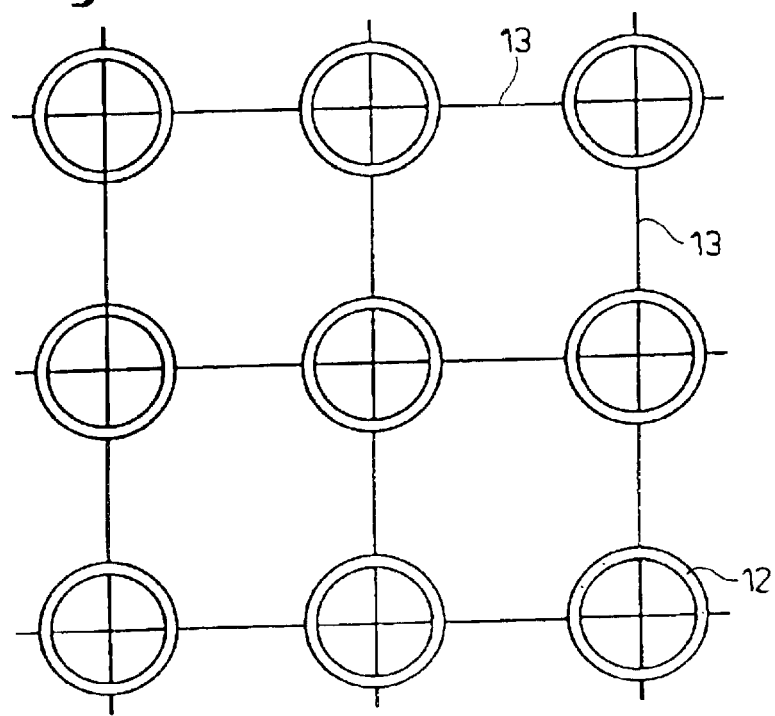
Figure 5A:
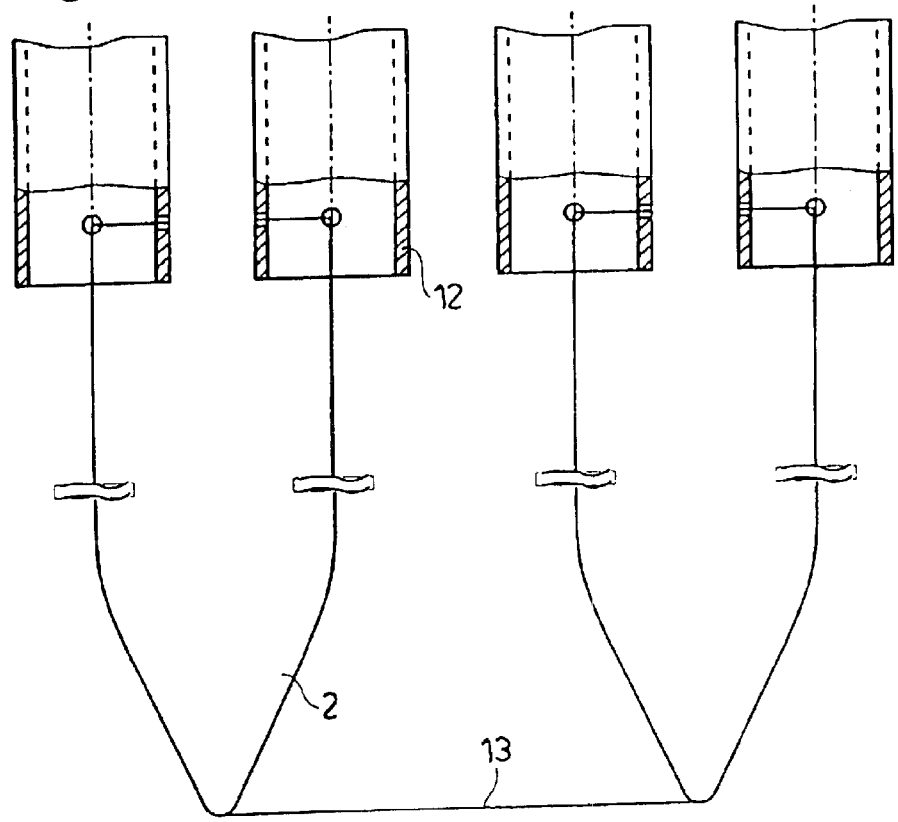
Figure 5B:
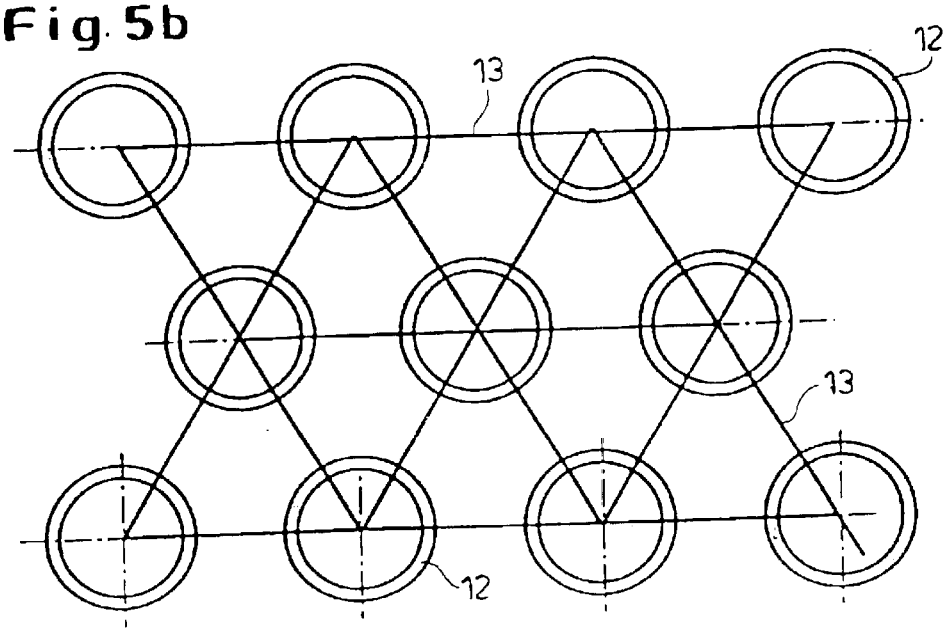

The distributor element as in Examples 1 and 2 can also be designed as follows. As shown in FIGS. 4 and 5, the product liquid is delivered to a wire loop 2 via heat exchange tubes 12 arranged vertically in the vessel 1. In the embodiment according to FIG. 4, the wire loops 2 are each disposed at the outlet of the heat exchange tubes 12; i.e. the heat exchange tubes in this case serve directly as a mounting for the wire loops 2. At their bottom ends, the wire loops 2 are linked, for reasons of stability, in the form of a lattice by transverse webs 13 (also see plan view from above). In the variation of the embodiment according to FIG. 5, in contrast, the wire loops 2 are each disposed on two adjacent heat exchange tubes 12, so that the liquid in each case is fed into one wire loop 2 via two liquid feeder means. In this embodiment, the wire loop ends tapering to a point are again interlinked by transverse ribs 13.

Figure 6C:
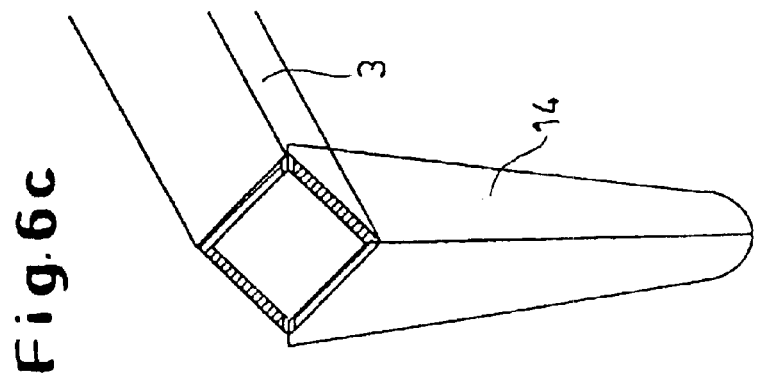
FIGS. 6a–6c show different designs of basket-like structures formed from wire loops.
Figure 6B:
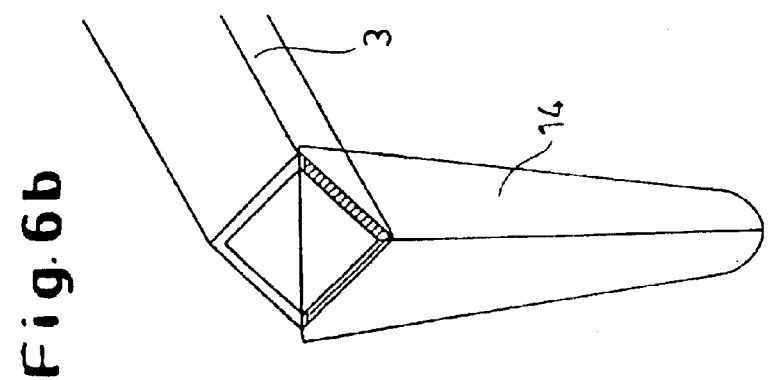
Figure 6A:
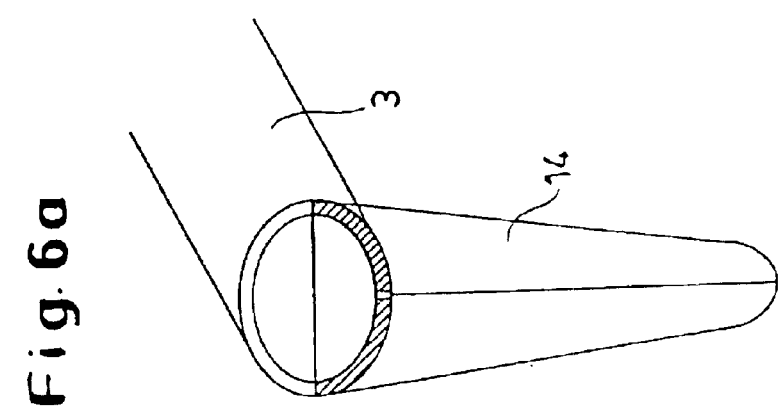
Figure 7:
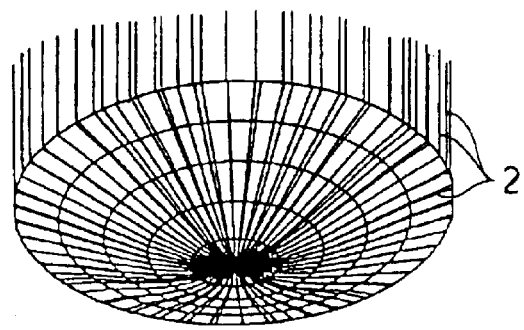
FIG. 7 shows an arrangement of wire loops on vertically disposed heat exchange tubes, with wire loops forming a wire mesh.

In all the abovementioned examples, the wire loops 2 are fabricated by bending a steel wire having a thickness of 1.5 mm and have a length (height of the loop) of 1.5 m. Particularly good utility is ensured, as shown in the figures, by a triangle-like shape, the apex of the triangle being located at the bottom end; i.e. the wire loop tapers from top to bottom in the flow direction of the liquid. According to the variations shown in FIGS. 6a to 6c and FIG. 7, the wire loops 2 can also be constructed in such a way that a plurality of wire loops are assembled to form a basket structure 14 (FIGS. 6a to 6c) or lattice structure (FIG. 7) which encloses a half-space. Such spatial structures can also be produced by means of wire meshes.

During operation, the mass flow rate of the product liquid supplied to the apparatus (controlled delivery) is adjusted so as to ensure that a defined lamella flow is established in the area enclosed by a wire loop (wire loop plane). The liquid supplied at the top end via the orifices 8 and 10 in the distributor element or via the individual tubes 12 distributes itself uniformly across the wire loop plane, the wire acting as a delimitation and flow guide element. It goes without saying that in the basket structures according to FIGS. 6a–6c, the product liquid fills the meshes only, not the interior of the basket structure or lattice structure.

At the bottom end of the wire loop, the devolatilized product liquid drips off into the sump at the vessel bottom. Surprisingly, this lamella flow (film flow) is established even in the case of a foaming polymer melt, thereby meeting the technological requirements for combined film and foam devolatilization and consequently achieving particularly high devolatilization efficiency. Foaming of the polymer melt in the devolatilization vessel can be achieved specifically by reducing the overall pressure in the vessel to below the vapour pressure of the volatile components to be removed from the polymer. A further option to produce foam and to improve the devolatilization efficiency is to admix the polymer, before it enters the vessel, with entrainers which are blended into the melt e.g. with the aid of a static mixer.

Example 4

Figure 9:
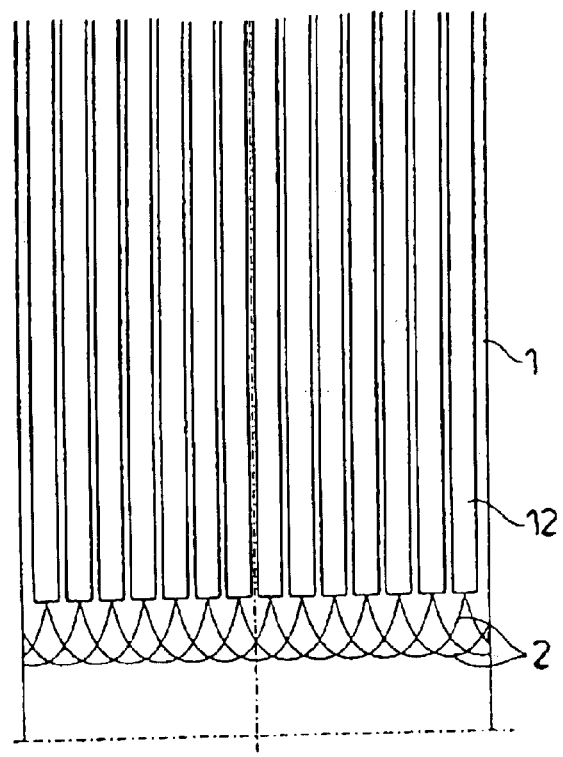
FIG. 9 shows an arrangement of wire loops on vertically disposed heat exchange tubes, the ends of the wire loops connecting orifices at a distance from one another.
Figure 10B:
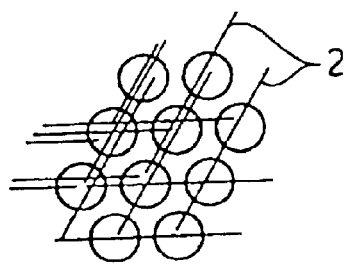
Figure 10A:
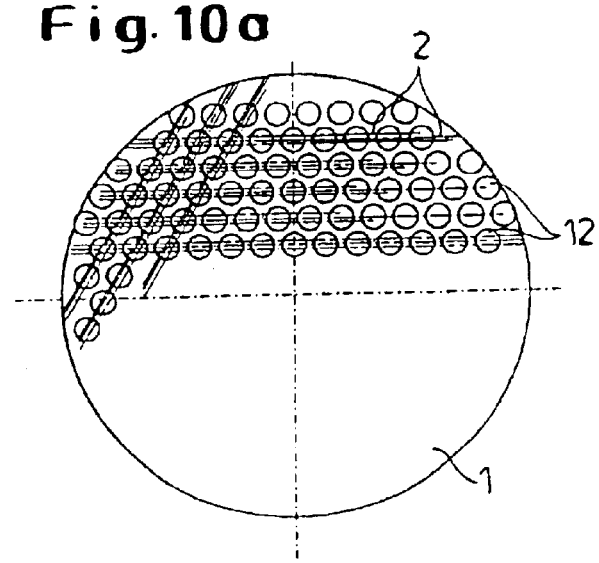
FIG. 10a shows the arrangement according to FIG. 9 schematically viewed from below.
Figure 11:
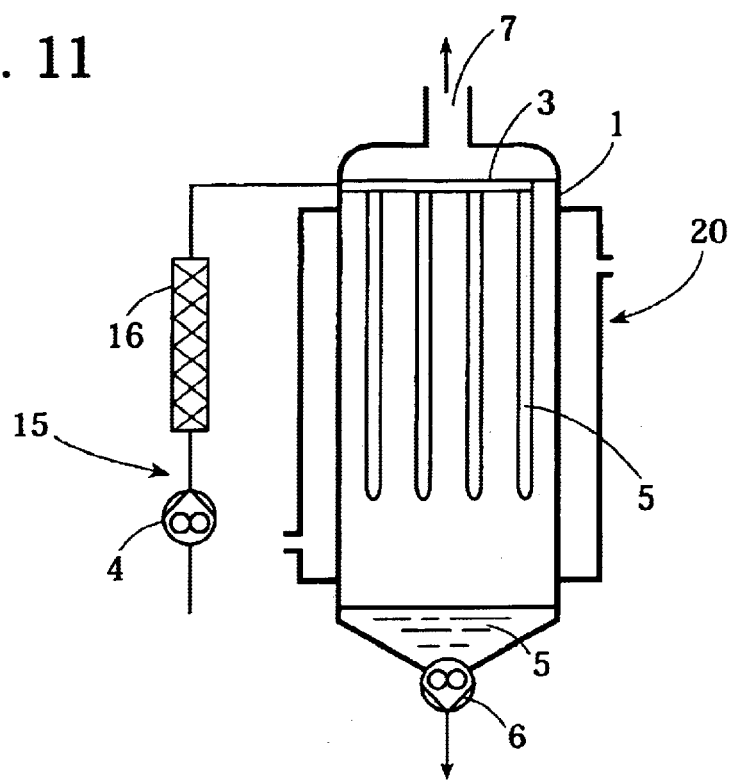
FIG. 11 shows the apparatus of FIG. 1, with the addition of a jacket 20 for heating medium.
Figure 12:
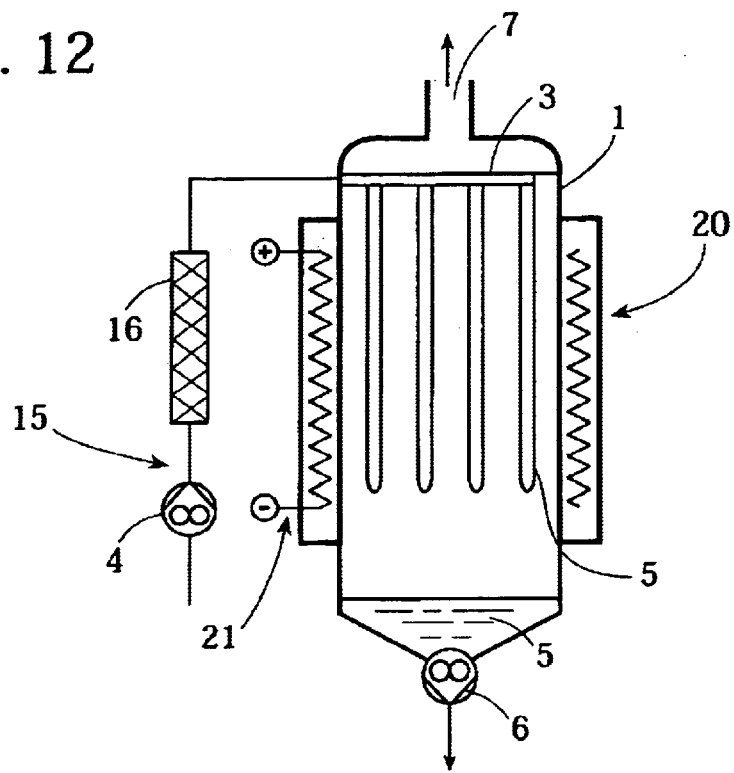
FIG. 12 shows the apparatus of FIG. 1, with an electrically heated jacket.

The FIGS. 9, 10a and 10b describe another arrangement of the evaporator, in which vertical heat exchange tubes 12 spaced further apart are linked at their orifices by means of the ends of the wire loops. In polymer processing, this leads to further damping of the product flow in the evaporator and surges are evened out.

Figure 8:
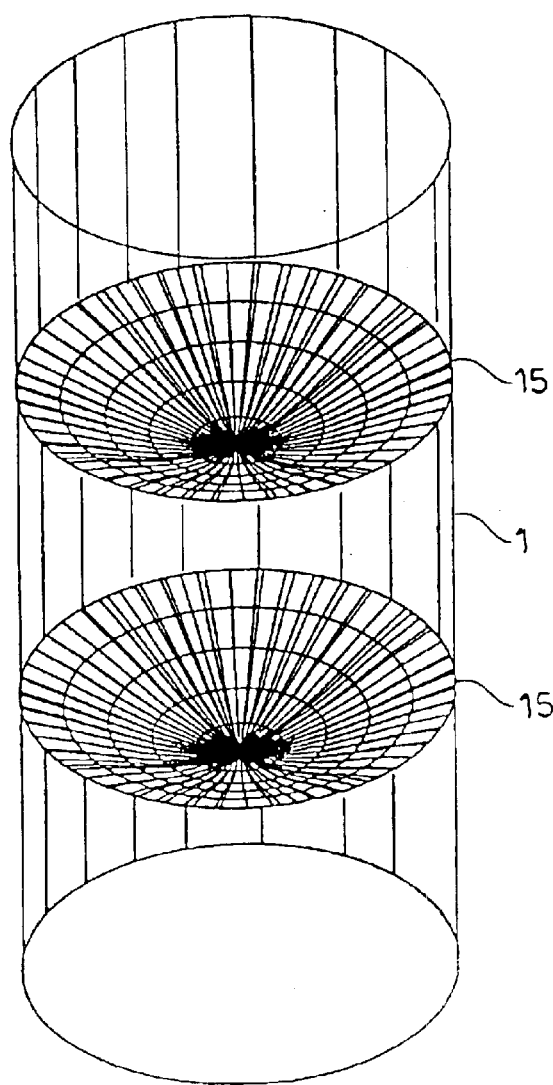
FIG. 8 shows an arrangement of two additionally fitted horizontal lattices.

If two additional lattices 15 are fitted underneath the wire loops 2, as shown in FIG. 8, this ensures further evening-out of the product flow. The grids 15 shown, sagging slightly towards the centre, provide the additional option of guiding the product stream to some extent towards a location directly above the product outlet 6.

What is claimed is:

1. Apparatus for carrying out mass transfer processes with a high-viscosity liquid, comprising at least one vertically disposed vessel having a feed distributor for the liquid to be treated, an outlet for volatile components and an outlet for the treated liquid, the feed distributor having a multiplicity of orifices for subdividing the high-viscosity liquid to be treated into a multiplicity of individual streams, wherein essentially vertically arranged wire loops, each of which encloses an area of from 0.5 cm$^2$ to 2500 cm$^2$, are disposed in the vicinity of the orifices, along which wire loops the high-viscosity liquid runs off under the action of gravity.

2. Apparatus according to claim 1, wherein the teed distributor is a perforated plate.

3. Apparatus according to claim 1, wherein the feed distributor comprises at least one horizontally arranged tube which has orifices pointing downwards, upwards or both.

4. Apparatus according to claim 3, wherein said orifices are slotted orifices pointing upwards.

5. Apparatus according to claim 4, wherein the wire loops are clipped into said orifices.

6. Apparatus according to claim 1, wherein the wire loops in the vicinity of the orifices in the feed distributor are disposed detachably.

7. Apparatus according to claim 1, wherein at least two-of the wire loops at a time are combined Into a lattice or wire mesh in the form of a basket.

8. Apparatus according to claim 7, wherein at least two adjacent lattices or wire meshes are linked to one another.

9. Apparatus according to claim 1, wherein the wire loops are attached to the bottom of said at least one vessel.

10. Apparatus according to claim 1, wherein the wire loops comprising heaters for the wire loops.

11. Apparatus according to claim 10, wherein said heaters are electrical resistance heaters in the wire loops.

12. Apparatus according to claim 1, wherein the feed distributor is formed of heat exchange tubes which are vertically arranged in said at least one vessel, debauch into the vessel and have orifices, the wire loops being attached to the bottom ends of said heat exchange tubes.

13. Apparatus according to claim 1, wherein the wire loops taper in the direction of flow of the liquid.

14. Apparatus according to claim 13, wherein said wire loops form an acute angle at their bottom ends.

15. Apparatus according to claim 1, wherein the vessel is designed to be heatable, coolable or both.

16. Apparatus according to claim 15, wherein said at least one vessel is provided with a heat exchange jacket.

17. Apparatus according to claim 16, wherein said heat exchange jacket comprises an electrical heater.

18. Apparatus according to claim 16, wherein said heat exchange jacket is adapted to accomodate the flow of a heat transfer medium therethrough.

19. Apparatus according to claim 1, wherein the top ends of individual wire loops are disposed at different orifices.

20. Apparatus according to claim 1, wherein one wire lattice, or a plurality of wire lattices essentially arranged horizontally above one another, are additionally provided below the orifices.

21. A method for boiling down and devolatilizing high-viscosity liquids and for carrying out chemical reactions between liquid layer and a surrounding gas space which contains a reactive gas component, and for condensation reactions which comprises carrying out said boiling down and devolatizing, or said reactions in an apparatus comprising at least one vertically disposed vessel having a feed distributor for the liquid to be treated, an outlet for volatile components and an outlet for the treated liquid, the feed distributor having a multiplicity or orifices for subdividing the high-viscosity liquid to be treated into a multiplicity of individual streams, wherein essentially vertically arranged wire loops, each of which encloses an area of from 0.5 cm$^2$ to 2500 cm$^2$, are disposed in the vicinity of the orifices, along which wire loops the high-viscosity liquid runs off under the action of gravity.

* * * * *

UNITED STATES PATENT AND TRADEMARK OFFICE
CERTIFICATE OF CORRECTION

PATENT NO.    : 6,761,797 B2
DATED         : July 13, 2004
INVENTOR(S)   : Kohlgruber et al.

It is certified that error appears in the above-identified patent and that said Letters Patent is hereby corrected as shown below:

Column 7,
Line 47, "the teed" should read -- the feed --

Column 8,
Line 5, "combined Into" should read -- combined into --

Signed and Sealed this

Eighth Day of February, 2005

JON W. DUDAS
*Director of the United States Patent and Trademark Office*